UNITED STATES PATENT OFFICE.

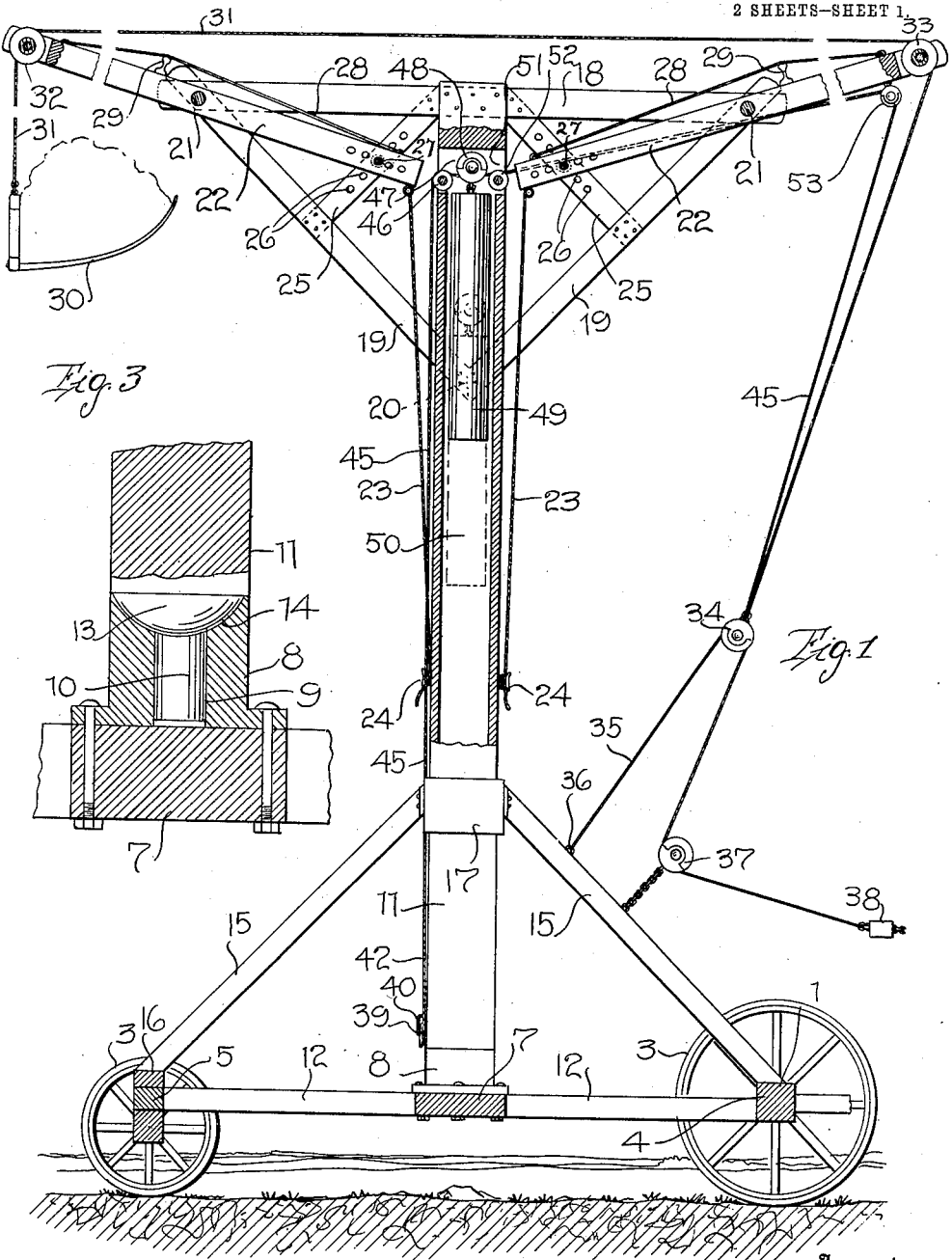

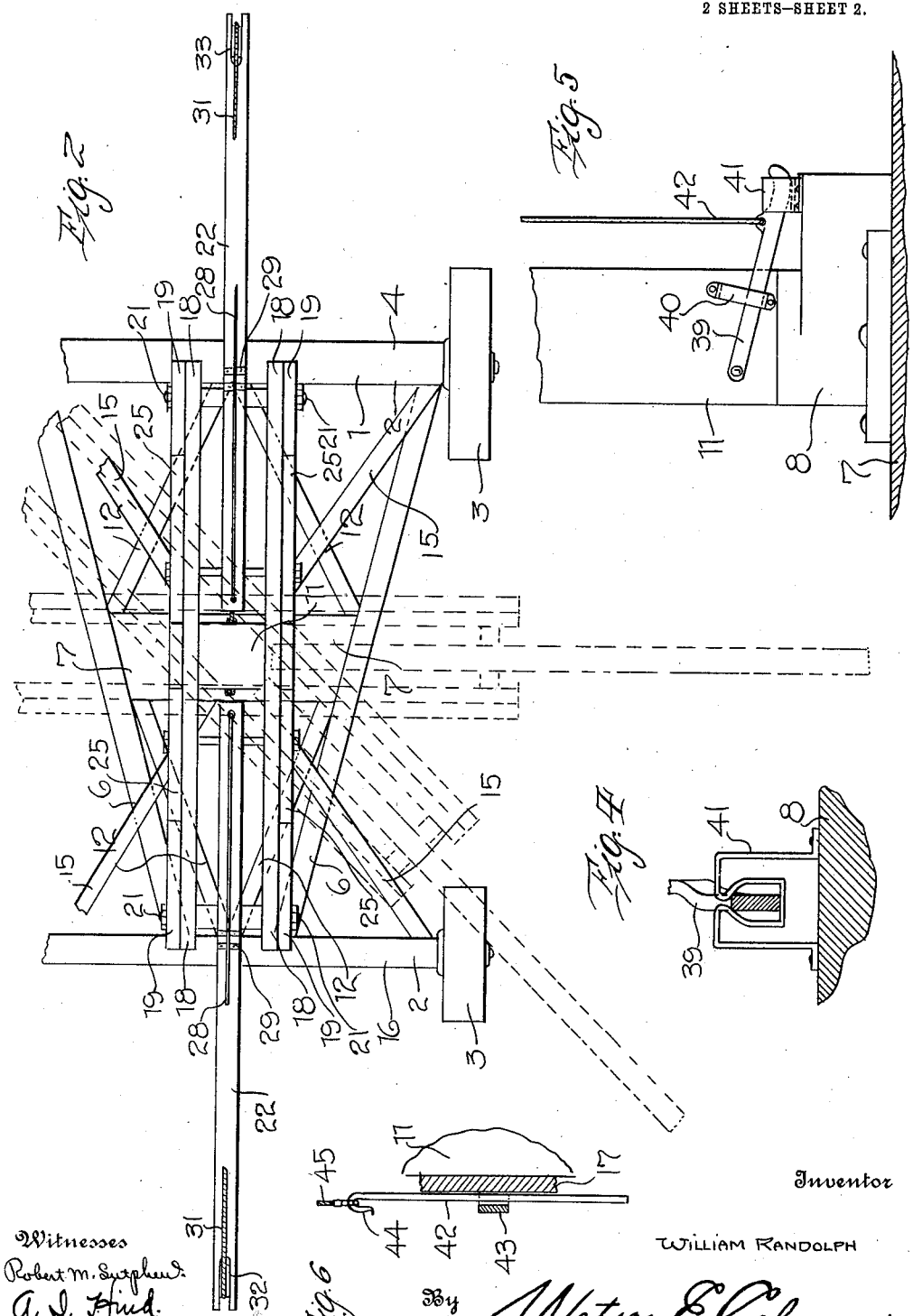
W. RANDOLPH.
HAY STACKER.
APPLICATION FILED APR. 23, 1913.
1,094,017.
Patented Apr. 21, 1914.
2 SHEETS—SHEET 2.

WILLIAM RANDOLPH, OF CROWS LANDING, CALIFORNIA.

HAY-STACKER.

1,094,017.  Specification of Letters Patent.  Patented Apr. 21, 1914.

Application filed April 23, 1913. Serial No. 763,174.

*To all whom it may concern:*

Be it known that I, WILLIAM RANDOLPH, a citizen of the United States, residing at Crows Landing, in the county of Stanislaus and State of California, have invented certain new and useful Improvements in Hay-Stackers, of which the following is a specification, reference being had to the accompany drawings.

This invention relates to new and useful improvements in stackers and more particularly to a hay stacker, the object of the invention being to provide a hay stacker wherein the hay may be quickly and readily raised and the same swung to a position over the stack whereby the load on the hay fork may be readily deposited upon the top of the stack.

Another object of the invention is to provide a hay stacker comprising a portable frame, upon which is mounted a rotatable standard having upon its upper end pivotally mounted beams and suspended from one of said beams is a loading fork which is adapted to be readily loaded and raised to a position sufficiently high so that when the standard is rotated, the same will be disposed directly above the stack upon which the hay is being piled.

A further object of the invention is to provide means for adjusting the pivotally mounted beams whereby the fork may be raised to various heights according to the height of the stack.

A still further object of the invention is to provide a suitable trip mechanism whereby when the loaded fork reaches a certain height, the standard will be released so that the same may be rotated and the loaded fork be disposed above the top of the stack.

A still further object of the invention is to provide a hay stacker of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a side elevation of a hay stacker constructed in accordance with my invention, parts being broken away and in section; Fig. 2 is a top plan view illustrating in dotted lines various positions of the same; Fig. 3 is a detail enlarged sectional view illustrating the manner of mounting the standard; Fig. 4 is an elevation of one of the catch members, showing the engagement of the trip therewith; Fig. 5 is a side elevation of the lower end of the standard, illustrating the application of the trip member; and Fig. 6 is a vertical sectional view through the supporting collar.

Referring more particularly to the drawings, 1 indicates the stationary frame which is suitably mounted upon the traction axles 2, said axles having the traction wheels 3 mounted upon the ends thereof whereby the frame may be transported from place to place. The frame in itself comprises a long transverse bar 4 mounted upon the rear axle and a short transverse bar 5 mounted upon the front axle, said bars having their ends suitably connected by the angularly disposed bars 6. The bars 6 are suitably connected by a third transverse bar 7 and mounted upon the bar 7 at its intermediate portion is a base member 8 which is provided with a centrally arranged opening 9 adapted to receive the reduced end portion 10 of the upright standard 11. The bar 7 is held securely in position by means of the brace members 12, each having one of their ends secured to one of the transverse bars 4 and 5 and the other end rigidly secured to the bar 7.

The standard 11 is provided at its lower end with the convex surface 13 which rest upon the concave seat 14 formed upon the upper end of the base member 8 whereby the standard may be readily rotated upon the base. The standard 11 is suitably held in an upright position by means of the braces 15, the lower ends of which are secured to the outer ends of the transverse bars 4 and 16, the bar 16 being suitably mounted upon and rigidly secured to the transverse bar 5. The upper ends of the braces 15 are rigidly connected by means of a collar 17, which encircles the standard 11 to securely hold the same in an upright position. Secured to the upper end of the standard 11 and arranged in spaced parallel relation are the arms 18, to the ends of which are secured, upon the outer sides thereof the upper ends of the braces 19, said braces being disposed in an angular position and having their lower ends rigidly secured to the standard 11 adjacent the upper end thereof as shown at 20.

Pivotally mounted at their intermediate portions between the outer ends of the arms 18 and the brace members 19, by means of the pins 21, are the beams 22, to the inner ends of which are connected the adjusting ropes 23. The ropes 23 are secured to the inner ends of the beams 22 so that the outer ends of the beams 22 may be raised or lowered according to the height desired. The lower ends of the ropes 23 are securely held in position by having the same wound upon the brackets 24 which are secured upon opposite sides of the standard 11. The inner ends of the beams 22 are movable between the spaced bars 25, said bars being provided with the alined openings 26 adapted for the reception of the removable pins 27 against which the inner ends of the beams 22 are adapted to abut whereby the pins will retain said beams in their various adjusted positions. The beams 22 are suitably braced by means of the truss wires 28, one end of which is secured to the outer ends of the beams and the other end secured to the inner ends of the beams, the intermediate portions of the said truss wires being arranged in spaced relation with the beams by means of the spacing blocks 29.

A fork 30 is suitably suspended from one end of one of the beams 22 by means of the cable 31, said cable passing upwardly over the pulley 32, thence across and around the pulley 33, which is mounted in the outer end of the other of said beams. The cable 32 after passing around the pulley 33 extends downwardly and the end thereof is secured to the pulley 34. One end of the actuating cable 35 is rigidly secured to an eye 36 carried by one of the brace members 15, the other end of the actuating cable passing up through the pulley 34, thence downwardly through a second pulley 37 and the end thereof is secured to a whiffletree 38 to which the draft animals are hitched.

The standard 11 is securely held against rotary movement by a pivotally mounted trip 39, said trip being mounted upon the lower end of the standard and adapted to work within a guide 40, said guide limiting the pivotal movement of the trip. The outer end of the trip, when in its operative position is engaged within the resilient catch member 41 which is mounted upon the transverse bar 7 and disposed upon one side of the standard 11. Secured to the upper edge of the trip bar 39 is a rod 42, the upper end of which works within a suitable guide 43 which is carried by the collar 17. Removably secured within the eye 44, which is formed upon the upper end of the rod 42 is the trip cable 45, the other end of said cable passing upwardly in parallel relation with the standard 11, thence over a pulley 46 arranged within the opening 47 formed in the standard 11, said cable then passing downwardly and through the pulley 48 which is secured to the upper end of a weight 49, said weight being vertically movable within the cylindrical bore 50 formed in the standard 11. The trip cable 45 after passing around the pulley 48 passes upwardly and out through the opening 51 and over the pulley 52 which is mounted within said opening.

The trip cable after passing over the pulley 52 extends across to the outer end of the beam 22 around the pulley 53, thence downwardly and the end thereof is securely fastened to the pulley 34. The weight 49 which is arranged within the intermediate portion of the trip cable 45 and vertically movable within the bore 50 is adapted to take up the slack in the cable so that the same will not become entangled with the cable 31 or the ropes 23. The brace members 15 are provided adjacent their upper ends with the eye 36 whereby the standard 11 may be rotated and the beams 22 disposed in various positions, the eyes being so positioned that the actuating cable 35 and the pulley 37 may be readily secured thereto with respect to the position of the beams.

In the practical operation of my device, the standard 11 is rotated so that the beams are disposed at an angle with respect to the frame and arranged at one side of the stack upon which the hay is being piled, as shown in Fig. 2. The fork 30 is loaded and the draft animals which are secured to the whiffletree 38 are driven forward, pulling upon the actuating cable 35, this action pulling downwardly upon the trip cable 45 and the cable 31. The loaded fork 30 is raised in a vertical position, and after the same has reached a sufficient height above the top of the stack upon which the hay is being piled, the weight 49 will have reached the top of the bore 50 and any further pulling upon the trip cable will release the trip 39 from the catch 41 permitting the standard 11 to rotate, the pulling upon the outer end of the beam 22 rotating the standard so that the fork 30 will be disposed above the stack from whence the load thereon may be readily removed.

From the above description taken in connection with the accompanying drawings, it will be readily apparent that by the manipulation of the ropes 23, the outer ends of the beams 22 may be readily raised or lowered to various heights. It will also be apparent that the standard 11 may be readily rotated so that the beams may be disposed in various positions with respect to the frame upon which the standard is mounted. It will also be apparent that the standard 11 is securely held against rotation by means of the trip 39 and the same is readily released when the fork is raised by the pulling power applied to the outer end of the trip cable 45. It will also be apparent that the device in itself is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A hay stacker including a portable frame, an upright standard rotatably mounted thereon, means for supporting said standard in an upright position, and means for holding said standard against rotation, longitudinal beams pivotally mounted upon the upper end of the standard, means secured to the inner ends of said beams for adjusting the outer ends thereof to various heights, a hay fork adjustably suspended from the outer end of one of said beams, means for raising and lowering said hay fork, and automatic means for releasing said holding means when the fork reaches a certain height to permit the standard to rotate.

2. A hay stacker including a portable frame, an upright standard rotatably mounted thereon, means for supporting said standard in an upright position, means for holding said standard against rotation, spaced parallel arms secured to the upper end of said standard, brace members supporting the ends of said arms, longitudinal beams pivotally mounted between the ends of said arms, means secured to the inner ends of said beams whereby the outer ends thereof may be adjusted to various heights, a fork adjustably suspended from the outer end of one of said beams, means for raising and lowering said fork, and automatic means for releasing said holding means when the fork reaches a certain height to permit the standard to rotate.

3. A hay stacker including a portable frame, an upright standard rotatably mounted thereon, means for supporting said standard in an upright position, a catch member carried by the base, a pivoted trip carried by the standard and adapted to engage said catch member to hold said standard against rotation, longitudinal beams pivotally mounted upon the upper end of said standard, means for adjusting the outer ends of said beams to various heights, a fork suspended from the outer end of one of said beams, means for raising and lowering said fork and automatic means for releasing said trip when the fork reaches a certain height to permit the rotation of the standard.

4. A hay stacker including a portable frame, an upright standard rotatably mounted thereon and having a central bore, a catch member carried by said frame, a pivoted trip mounted upon the standard and adapted to engage said catch member to hold the standard against rotation, longitudinal beams pivotally mounted upon the upper end of said standard, a hay fork adjustably suspended from the outer end of one of said beams, a rod secured to said trip, a cable secured to the other end of said rod, a weight mounted within the bore of the standard and suspended from the intermediate portion of said cable, means for raising said fork, means in operative connection with said raising means for simultaneously raising the weight within the bore whereby when the fork reaches a certain height, the weight within the bore will reach the top of its travel and release the trip to permit the rotation of the standard.

5. A hay stacker including a portable frame, an upright standard rotatably mounted thereon, means for supporting said standard in an upright position, a catch member carried by said frame, a pivoted trip carried by the standard and adapted to engage said catch member to hold the standard against rotation, spaced parallel arms mounted upon the upper end of said standard, brace members supporting the ends of said arms, longitudinal beams pivotally mounted between the outer ends of said arms, means for adjusting the outer ends of said beams to various heights, a fork adjustably suspended from the outer end of one of said arms, means for raising said fork and automatic means for releasing said trip when the fork reaches a certain height to permit the rotation of the standard.

In testimony whereof I hereunto affix my signature in the presence of two witnesses.

WILLIAM RANDOLPH.

Witnesses:
L. McAulay,
Henry S. Ellis.